Feb. 26, 1963

W. S. ELLIOTT 3,079,562

TEMPERATURE-STABILIZED AND DISTORTIONLESS SEMICONDUCTOR DETECTOR

Filed Jan. 23, 1958

INVENTOR.

WILLIAM S. ELLIOTT

BY Moody and Goldman

ATTORNEYS

United States Patent Office 3,079,562
Patented Feb. 26, 1963

3,079,562

TEMPERATURE-STABILIZED AND DISTORTION-LESS SEMICONDUCTOR DETECTOR

William S. Elliott, Cedar Rapids, Iowa, assignor to Collins Radio Company, Cedar Rapids, Iowa, a corporation of Iowa Filed Jan. 23, 1958, Ser. No. 710,821
4 Claims. (Cl. 329—101)

This invention relates to semiconductor detectors.

Some types of semiconductor diodes and transistors have relatively large gap potentials caused by the atomic structure of the material from which they are made. Silicon diodes and transistors have, for example, substantial gap potentials of the order of 0.6 volt, which furthermore is highly variable with temperature and may range from 0.5 to 0.8 volt over a temperature variation of plus or minus 75°.

It is therefore an object of this invention to provide a low-signal-level detector circuit capable of using large-gap-potential semiconductors while being stabilized with respect to temperature variation.

It is another object of this invention to provide a detector circuit capable of using large-gap-potential semiconductors without distorting a detected low-level signal that is amplitude modulated to nearly 100%.

The energy-gap-potential of a semiconductor detector distorts a detective signal when it clips portions of the modulation envelope of the received signal that dip below the energy-gap-potential level. Such clipping distortion is particularly objectionable in conventional detectors which receive low input-signal levels.

The invention is constructed with either a pair of similar semiconductor diodes or a tetrode type transistor. When constructed with a pair of diodes, one is directly connected to ground while the other is connected to ground through a filtering capacitor and a resistor connected in parallel therewith. Opposite ends of a transformer secondary connect to the other electrodes which are the same type. The transformer primary receives a signal to be detected. The opposite electrode of the grounded diode is connected to a bias source which biases it to a voltage slightly greater than its energy-gap potential.

When the invention is constructed using a tetrode transistor, an input-transformer secondary has its opposite ends connected to the first and second bases of the transistor; and a filtering capacitor and resistor are connected to its collector. It is believed that this manner of dual-base connection to the tetrode transistor is analogous to the double-diode circuit and their basic operations are analogous although perhaps not obvious.

Further objects, features and advantages of the invention will be apparent to a person skilled in the art upon further study of the specification and the accompanying drawings, in which.

Figures 1, 2, 3, 4:
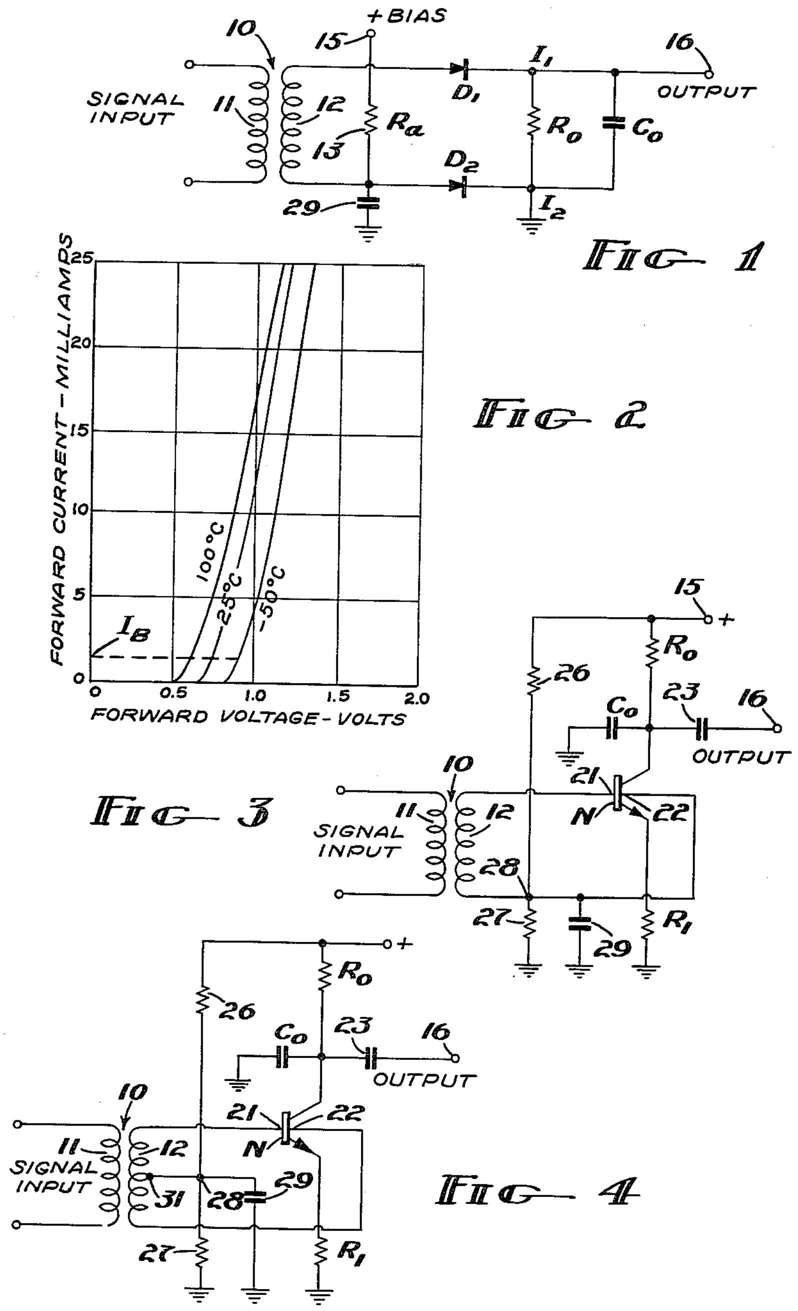
FIGURE 1 illustrates a diode form of the invention.
FIGURE 2 shows the energy-gap potential of silicon semiconductors and its variation with temperature.
FIGURE 3 illustrates a tetrode form of the invention.
FIGURE 4 is a modified tetrode form of the invention enabling full wave detection.

Now referring to the drawings for a more detailed explanation of the invention, FIGURE 1 includes a pair of diodes $D_1$ and $D_2$ which are silicon diodes. A resistor $R_0$ and capacitor $C_0$ are connected between the cathode of diode $D_1$ and ground. Also, the cathode of $D_2$ is connected to ground.

A transformer 10 has its primary 77 connected to a signal source, such as to an intermediate-frequency amplifier. Its secondary 12 has opposite ends connected to the anodes of diodes $D_1$ and $D_2$. A capacitor 29 is connected between ground and a point between diode $D_2$ and secondary 12 to provide signal ground level at one end of the secondary. A positive voltage bias source, connected to a terminal 15, is connected through a resistor 13 to the anode of diode $D_2$. Resistor 13 determines a current that causes a potential drop across diode $D_2$ slightly greater than its energy-gap potential. The evaluation of resistor 13 is easily deetrmined from curves provided by the manufacture of a particular type of diode. The potential drop provided across diode $D_2$ by the bias source is then also provided across diode $D_1$, resistor $R_0$ and the resistance of secondary 12. Thus, diode $D_1$ is biased to a lower value than $D_2$ due to the voltage drop across the resistance of secondary 12 and resistor $R_0$; but by keeping them small compared to the resistance presented by diode $D_1$, most of the bias is maintained across $D_1$.

The alternating-current axis of the signal across secondary 12 is maintained above ground potential by the drop across $D_2$ as the signal is detected by diode $D_1$ and appears at output terminal 16. Hence, a bias on diode $D_2$ higher than its gap potential is required to maintain a bias on diode $D_1$ at the gap potential. Accordingly, the incoming signal will not be clipped by gap potential. Hence, clipping distortion does not occur.

Furthermore, as the temperature changes, the gap potentials of both diodes $D_1$ and $D_2$ change together. Accordingly, the bias on them will change together, and there will be no substantial effect on the operation of the circuit due to temperature change. FIGURE 2 illustrates the change of gap potential with temperature. Resistor $R_a$ is proportioned to provide through diode $D_2$ a current $I_B$ (which is above the knee of its gap-potential characteristic). Therefore, it is seen that the same value of $I_B$ maintains approximately the same bias on diode $D_2$ regardless of the shift in gap potential caused by temperature change. Hence, the bias level on $D_1$ will remain above its gap potential regardless of temperature change.

FIGURE 3 illustrates a modified form of the invention that uses a tetrode transistor N made of silicon. In FIGURE 3, secondary 12 of the signal-input transformer has its opposite ends connected to the first and second bases 21 and 22 of transistor N. Its emitter is connected to ground through a resistor $R_1$ and its collector is connected to a bias source through a resistor $R_0$. The output is provided through a blocking capacitor 23 connected to its collector. A capacitor $C_0$ is connected between ground and the collector. Base bias on the transistor is established by means of a voltage-divider comprising resistors 26 and 27 connected between ground and the bias source terminal 15 with its intermediate point 28 connected to base 22 of the transistor. The bias is applied through secondary 12 to the first base 21, so that both bases have substantially the same bias. This is analogous to FIGURE 1 where the bias is applied through secondary 12 to the two diodes. The bias level provided at point 28 is determined from the characteristic curves of the transistor in a manner analogous to that done with the diodes in FIGURE 1. That is, resistors 26, 27, $R_0$ and $R_1$ are proportioned to provide a base-bias current which overcomes the gap potential. In FIGURE 3 resistors 26 and 27 are proportioned so that the bias is slightly greater than necessary to overcome the energy gap potential of the transistor. The capacitor 29 is connected across resistor 27 to provide a radio frequency ground for one end of transformer 12. Thus, the input signal alternating-current axis in secondary 12 floats as a function of energy gap potential level to prevent effects of temperature variation.

FIGURE 4 illustrates another form of the invention which permits full-wave rectification of the detected signal. On the other hand, the circuit of FIGURE 3 enabled half-wave rectification. The circuit of FIGURE 4 has a structural modification over FIGURE 3, enabling a doubling of the detected output. In the case of FIGURE 4, secondary 12 has a center tap 31, and capacitor 29 is connected between the center tap and ground to provide a radio-frequency ground. Also in FIGURE 4, the voltage divider comprising resistors 26 and 27 establishes bias on the bases 21 and 22 by having its intermediate point 28 connected to the transformer center tap 31. In all other respects, the circuit of FIGURE 4 is the same as given in FIGURE 3.

Temperature stabilization is obtained because the same bias is always being applied the two bases of transistor N. That is, whatever happens temperature-wise to one must also happen to the other, and the over-all effect is a canceling one with respect to changes in transistor operation.

Although this invention has been described with respect to particular embodiments thereof, it is not to be so limited as changes and modifications may be made therein which are within the full intended scope of the invention as defined by the appended claims.

I claim:

1. A temperature-stabilized detector circuit comprising a tetrode transistor having a pair of bases, a collector and an emitter; a signal-coupling transformer having a secondary, with the opposite ends of said secondary connected respectively to said pair of bases, impedance means connected between a bias source and said collector, a voltage divider having an intermediate point connected to said secondary to provide a bias on said pair of bases overcoming the energy gap potential of said transistor, and means connecting the emitter of said transistor to ground.

2. A temperature-stabilized detector circuit as defined in claim 1 in which said secondary includes a center-tap, and an intermediate point on said voltage divider being connected to said center-tap.

3. A temperature-stabilized detector circuit for preventing distortion for low input signal levels, comprising a signal-receiving transformer having a seocndary; a tetrode transistor having a pair of bases, emitter and collector; resistor means connected between ground and said emitter, second resistor means connected between said collector and a bias source, the ends of said secondary being connected respectively to said pair of bases, a voltage divider connected between ground and the bias source, means connecting a tap-point of said voltage divider to one of said bases, a capacitor having low reactance being connected between ground and said tap-point.

4. A temperature-stabilized detector circuit preventing clipping distortion with low levels of received signal, comprising a signal-receiving transformer having a secondary with a center tap; a tetrode transistor having a pair of bases, collector and emitter; the opposite ends of said secondary being connected respectively to said pair of bases, resistance means connected between ground and said emitter, a voltage divider connected between a bias source and ground having an intermediate point connected to said center tap, a capacitor having low reactance being connected between ground and said center tap, a resistor connected between said collector and the bias source, and a second capacitor connected between ground and said collector, with the detected output being provided from said collector.

References Cited in the file of this patent

UNITED STATES PATENTS

| | | |
|---|---|---|
| 2,778,956 | Dacey et al. | Jan. 22, 1957 |
| 2,870,413 | Cluwen | Jan. 20, 1959 |